(12) United States Patent
Anker et al.

(10) Patent No.: US 9,321,903 B2
(45) Date of Patent: Apr. 26, 2016

(54) USE OF A POLYOLEFIN COMPOSITION FOR PIPES AND FITTINGS WITH INCREASED RESISTANCE TO CHLORINE DIOXIDE

(75) Inventors: Martin Anker, Hisings Karra (SE); Tanja Piel, Linz (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 14/234,579

(22) PCT Filed: Jul. 23, 2012

(86) PCT No.: PCT/EP2012/003100
§ 371 (c)(1),
(2), (4) Date: Mar. 27, 2014

(87) PCT Pub. No.: WO2013/013806
PCT Pub. Date: Jan. 31, 2013

(65) Prior Publication Data
US 2014/0296398 A1    Oct. 2, 2014

(30) Foreign Application Priority Data
Jul. 25, 2011 (EP) .................................... 11006092

(51) Int. Cl.
| C08L 23/00 | (2006.01) |
| C08K 5/13 | (2006.01) |
| C08K 5/526 | (2006.01) |
| C08K 5/5393 | (2006.01) |
| C08L 23/08 | (2006.01) |

(52) U.S. Cl.
CPC .................. *C08K 5/5393* (2013.01); *C08K 5/13* (2013.01); *C08L 23/0815* (2013.01); *C08K 5/526* (2013.01)

(58) Field of Classification Search
CPC ........ C08K 5/13; C08K 5/526; C08K 5/5393; C08L 23/0815
USPC ............ 526/89, 204, 217; 524/135, 413, 440, 524/570
See application file for complete search history.

(56) References Cited

FOREIGN PATENT DOCUMENTS

| EP | 2199327 A1 * | 6/2010 |
| EP | 2199330 A1 * | 6/2010 |
| WO | WO 2010149607 A1 * | 12/2010 |

* cited by examiner

*Primary Examiner* — Kelechi Egwim
(74) *Attorney, Agent, or Firm* — Milbank, Tweed, Hadley & McCloy LLP

(57) ABSTRACT

The present invention relates to the use of a polyolefin composition for water pipes or fittings with increased resistance to degradation caused by chlorine dioxide-containing water, particularly to the use of a combination of particular types of antioxidants for increasing the resistance of a polyolefin composition against degradation caused by contact with chlorine dioxide-containing water.

10 Claims, No Drawings

USE OF A POLYOLEFIN COMPOSITION FOR PIPES AND FITTINGS WITH INCREASED RESISTANCE TO CHLORINE DIOXIDE

This application, filed under 35 U.S.C. §371, is based on International Application No. PCT/EP2012/003100, filed Jul. 23, 2012, which claims priority to European Patent Application No. 11006092.8, filed on Jul. 25, 2011, the disclosures of which are herein incorporated by reference in their entireties.

The present invention relates to the use of a polyolefin composition for water pipes or fittings with increased resistance to degradation caused by chlorine dioxide-containing water, particularly to the use of a combination of particular types of antioxidants for increasing the resistance of a polyolefin composition against degradation caused by contact with chlorine dioxide-containing water.

Recent progresses in the manufacturing and processing of polymers have led to the application of plastics in virtually every aspect of modern day life. However, polymeric compounds are prone to aging under the effects of oxidants, light and heat. This results in a loss of lifetime such as loss of strength, stiffness and flexibility, discoloration and scratching as well as loss of gloss.

It is well-known in the art that antioxidants and light stabilizers can prevent or at least reduce these effects. Several types of additives are added to polymers to protect them during processing and to achieve the desired end-use properties. Additives are generally divided in stabilizers and modifiers. Stabilizers, like antioxidants, traditionally and currently used comprise sterically hindered phenolics, aromatic amines, hindered amine stabilizers, organo-phosphites/phosphonites and thioethers. However, appropriate combinations of stabilizers have to be carefully selected, depending on the desired final properties, the polymeric article should have.

Besides many other applications, polyolefins are used for the preparation of pipes or fittings for drinking water distribution systems. In the following disclosure all characteristics and effects supplied to pipes are also supplied to fittings, even if not mentioned specifically. To ensure that the drinking water intended for human consumption is of good quality, disinfection is often used. Disinfection means the removal, deactivation or killing of pathogenic microorganisms.

It is known that chlorine is used as disinfectant in water treatment to prevent spread of infectious diseases. The chlorine source for the resulting chlorinated water is chlorine gas or hypochlorite. There is a chemical equilibrium of chlorine, hypochlorite and chloride in water which is known by the skilled person.

One of the disadvantages of chlorinated water is the presence of chlorine-containing reaction products of chlorine with organic material in the drinking water. Some of said reaction products are discussed to provide health risks.

It is also known that most materials, including many polymers such as polyolefins, age in chlorinated water. Results from pressure testing in laboratories and experience from the field have shown that high concentration of chlorine in water can cause early brittle fracture in polyolefin pipes.

An effective alternative disinfectant for drinking water systems is chlorine dioxide, $ClO_2$. Chlorine dioxide is a stronger oxidizing agent than chlorine and does not form halogenated by-products. It does not hydrolyze in water but remains in solution as a dissolved gas.

Nevertheless, also chlorine dioxide-containing water is in permanent contact with the pipe material. Due to the permanent contact to the inner pipe surface, deterioration of the polyolefin composition is caused.

It has been found that antioxidants used in polyolefin compositions for pipes known to provide good resistance to chlorinated water do not necessarily provide satisfactory resistance against chlorine dioxide-containing water. Thus, there is still a need for a more efficient antioxidant which provides a better protection against $ClO_2$-containing water to a polyolefin composition, and thus allows for a longer lifetime of e.g. a pipe, made of a polyolefin composition containing such an antioxidant.

A further important issue as regards the presence of antioxidants in polyolefin compositions is the aim to avoid contamination of media transported e.g. in a pipe made of such a polyolefin composition. This is particularly important in case of a pipe transporting drinking water. Generally speaking, it is preferred to use as low concentrations of antioxidant as possible in order to lower the amount of antioxidant which may possibly be extracted by the water transported in the pipe. Further in this context, it is desirable that the antioxidant used has a low tendency to extraction by the water transported in the pipe.

Hence, there is still a need for improved polyolefin compositions suitable for water pipe applications, particularly for polyolefin compositions having an increased lifetime in contact to chlorine dioxide-containing water.

Thus, it is an object of the present invention to provide a polyolefin composition for pipes having an increased lifetime in permanent contact with chlorine dioxide-containing water.

The present invention is based on the finding that the object of the invention can be achieved, if the polyolefin composition comprises a specific combination of several types of antioxidants.

Therefore, the present invention relates to the use of a combination of two antioxidants (B) and (C) in a polyolefin composition for increasing the lifetime of a pipe or a fitting made of said polyolefin composition which pipe or fitting is in permanent contact with chlorine dioxide-containing water, wherein said antioxidants are the following:

antioxidant (B) with general formula $R^1$—$P(OAr)_2$, wherein OAr is according to formula (I):

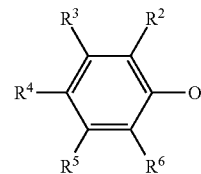

wherein
$R^1$ is a non-substituted or substituted aliphatic or aromatic hydrocarbyl radical which may comprise heteroatoms,
$R^2$, $R^3$, $R^4$, $R^5$ and $R^6$ independently are a hydrogen atom or non-substituted or substituted aliphatic or aromatic hydrocarbyl radicals which may comprise heteroatoms,
and
antioxidant (C) according to formula (II):

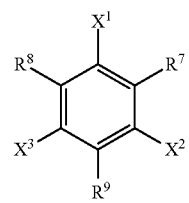

wherein
$R^7$, $R^8$ and $R^9$ independently are non-substituted or substituted aliphatic or aromatic hydrocarbyl radicals which may comprise OH-groups, $X^1$, $X^2$, and $X^3$ independently are H or OH, with the proviso that at least one of $X^1$, $X^2$ and $X^3$ is OH, the entire molecule does not comprise an ester group.

$R^1$ preferably is an aliphatic or aromatic hydrocarbyl radical, wherein the heteroatoms present are selected from oxygen, nitrogen and phosphor atoms.

In case of at least one phosphor atom it is particularly preferred that $R^1$ is directly attached to the phosphor atom of formula $R^1$—$P(OAr)_2$ via a carbon atom of an aromatic hydrocarbyl radical which itself is directly attached to a further phosphor atom of a further group $P(OAr)_2$ via a different carbon atom of said aromatic hydrocarbyl radical, i.e. $R^1$ is an aromatic hydrocarbyl radical bridging two $P(OAr)_2$-groups.

Preferably, the amount of carbon atoms in said bridging aromatic hydrocarbyl radical is between 6 and 25, more preferably between 6 and 20.

In an alternative particularly preferred embodiment $R^1$ is an aliphatic or aromatic hydrocarbyl radical wherein the only heteroatoms present are oxygen atoms, one of which connects $R^1$ with the phosphor atom of the $P(OAr)_2$-group. Still more preferably, said oxygen atom is the only heteroatom present.

In the above-mentioned alternative preferred embodiment it is further preferred that $R^1$ comprises between 1 and 20 carbon atoms, more preferably between 2 and 16 carbon atoms.

In said alternative preferred embodiment it is further preferred that apart from said connecting oxygen atom $R^1$ does not comprise a further heteroatom and said oxygen atom connects an aliphatic hydrocarbyl radical with the $P(OAr)_2$-group, preferably an unbranched alkyl chain.

In said alternative preferred embodiment it is further preferred that apart from said connecting oxygen atom $R^1$ does not comprise a further heteroatom and said oxygen atom connects an aromatic hydrocarbyl radical with the $P(OAr)_2$-group, still more preferably $R^1$ is OAr as defined herein.

$R^2$, $R^3$, $R^4$, $R^5$ and $R^6$ preferably comprise between one carbon atom and 20 carbon atoms each, more preferably not more than 10 carbon atoms each.

Preferably, $R^2$, $R^3$, $R^4$, $R^5$ and $R^6$ do not comprise any heteroatom.

Preferably, $R^2$, $R^3$, $R^4$, $R^5$ and $R^6$ are a hydrogen atom or aliphatic hydrocarbyl radicals, more preferably alkyl radicals. Even more preferred is that at least one of $R^2$, $R^4$ and $R^6$ is an alkyl radical, more preferably with one to four carbon atoms, more preferably a methyl group or a tert-butyl group. Still more preferably, $R^3$ and $R^5$ are hydrogen atoms.

In a particular preferred embodiment at least two of $R^2$, $R^4$ and $R^6$ are a tert-butyl group.

It is further preferred that $R^2$, $R^3$, $R^4$, $R^5$ and $R^6$ is the same in the $P(OAr)_2$-group and in the preferred embodiment wherein $R^1$ is OAr as defined herein.

A particular preferred antioxidant (B) is tris(2,4-di-t-butylphenyl)phosphite (Irgafos 168).

In antioxidant (C) according to formula (II) residues $R^7$, $R^8$ and $R^9$ independently are non-substituted or substituted aliphatic or aromatic hydrocarbyl radicals which may comprise OH-groups. This means that apart from OH-groups no further heteroatoms are present in $R^7$, $R^8$ and $R^9$, so that phenolic stabilizer (C) is e.g. free of ester groups, amide groups and groups containing phosphorus.

Preferably, $R^7$, $R^8$ and $R^9$ which independently are non-substituted or substituted aliphatic or aromatic, more preferably aliphatic, hydrocarbyl radicals which may comprise OH-groups, have from 2 to 200 carbon atoms.

Preferably, $R^7$ and $R^8$ independently have from 2 to 20 carbon atoms, more preferably from 3 to 10 carbon atoms.

Furthermore, it is preferred that $R^7$ and/or $R^8$, more preferably $R^7$ and $R^8$, are aliphatic hydrocarbyl groups, more preferably alkyl radicals, still more preferably with at least 3 carbon atoms which have a branch at the carbon atom connected to the aromatic ring, and most preferably $R^7$ and/or $R^8$, more preferably $R^7$ and $R^8$, are tert-butyl groups.

Preferably, $R^9$ has from 20 to 100 carbon atoms, more preferably has from 30 to 70 carbon atoms.

Furthermore, it is preferred that $R^9$ includes one or more phenyl residues.

Still further, it is preferred that $R^9$ includes one or more hydroxyphenyl residues.

Preferably, in antioxidant (C) of formula (II) $X^1$ is OH, and most preferably $X^1$ is OH and $X^2$ and $X^3$ are H.

It is particularly preferred that antioxidant (C) is 1,3,5-Trimethyl-2,4,6-tris-(3,5-di-tert. butyl-4-hydroxyphenyl)benzene (Irganox 1330).

Antioxidant (B) is preferably contained in the composition in an amount of 5000 ppm or less, more preferably 2000 ppm or less, still more preferably 1200 ppm or less, based on the total composition.

The amount of antioxidant (C) in the polyolefin composition is preferably 5000 ppm or less, more preferably 4450 ppm or less, more preferably 3600 ppm or less, still more preferably 2500 ppm or less and particularly preferred is 1300 ppm or less, based on the total composition.

Usually, the composition will contain any of the antioxidants (B) and (C) independently in an amount of at least 50 ppm.

Preferably, the sum of concentration of antioxidants (B) and (C) is between 1500 and 6000 ppm, more preferably between 1800 and 5500 ppm.

The term "base resin" denotes the entirety of polymeric components in the polyolefin composition according to the invention, usually making up at least 90 wt % of the total composition.

The favourable effect of the antioxidants according to the present invention is not dependent on the type of polyolefin base resin used. The base resin may therefore be any polyolefin or polyolefin composition.

However, it is preferred that the base resin (A) comprises an ethylene homo- or copolymer or a propylene homo- or copolymer. Preferably, the comonomer is selected from ethylene and alpha-olefins with 4 to 8 carbon atoms. Still more preferably ethylene or an alpha-olefin selected from 1-butene, 1-hexene, 4-methyl-1-pentene and 1-octene is used.

The amount of comonomer in the base resin (A) is preferably between 0.1 mol % and 7.0 mol %.

It is particularly preferred that the base resin (A) comprises an ethylene homo- or copolymer, more preferably that the base resin (A) consists of an ethylene homo- or copolymer.

In one embodiment of the invention the base resin comprises two or more polyolefin, more preferably polyethylene, fractions with different weight average molecular weight. Such resins usually are denoted as multimodal resins.

Polyolefin, in particular polyethylene, compositions comprising multimodal resins are frequently used e.g. for the production of pipes or fittings due to their favourable physical and chemical properties as e.g. mechanical strength, corrosion resistance and long-term stability. Such compositions are described e.g. in EP 0 739 937 and WO 02/102891. The term molecular weight used herein generally denotes the weight average molecular weight $M_w$.

As mentioned, usually a polyethylene composition comprising at least two polyolefin fractions, which have been produced under different polymerisation conditions resulting in different weight average molecular weights for the fractions, is referred to as "multimodal". The prefix "multi" relates to the number of different polymer fractions the composition is consisting of. Thus, for example, a composition consisting of two fractions only is called "bimodal".

The form of the molecular weight distribution curve, i.e. the appearance of the graph of the polymer weight fraction as function of its molecular weight, of such a multimodal polyethylene will show two or more maxima or at least be distinctly broadened in comparison with the curves for the individual fractions.

For example, if a polymer is produced in a sequential multistage process, utilising reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions are superimposed into the molecular weight distribution curve for the total resulting polymer product, usually yielding a curve with two or more distinct maxima.

In a preferred embodiment wherein the base resin consists of two polyethylene fractions, the fraction having a lower weight average molecular weight is denoted fraction (A), the other is denoted fraction (B).

Fraction (A) preferably is an ethylene homopolymer.

Fraction (B) preferably is an ethylene copolymer, and preferably comprises at least 0.1 mol % of at least one alpha-olefin comonomer. The amount of comonomer is preferably at most 14 mol %.

In a preferred embodiment wherein the polyolefin composition is a polyethylene composition, the base resin of the polyethylene composition preferably comprises at least 0.1 mol %, more preferably at least 0.3 mol %, and still more preferably at least 0.7 mol % of at least one alpha-olefin comonomer. The amount of comonomer is preferably at most 7.0 mol %, more preferably at most 6.0 mol %, and still more preferably at most 5.0 mol %.

As an alpha-olefin comonomer, preferably an alpha-olefin having from 4 to 8 carbon atoms is used. Still more preferably an alpha-olefin selected from 1-butene, 1-hexene, 4-methyl-1-pentene and 1-octene is used.

The polyolefin base resin preferably has an $MFR_5$ (190° C., 5 kg) of from 0.1 to 2.0 g/10 min, more preferably from 0.2 to 1.5 g/10 min, and most preferably from 0.5 to 1.0 g/10 min.

The density of the base resin preferably is from 930 to 960 $kg/m^3$, more preferably is from 935 to 958 $kg/m^3$, and most preferably is from 936 to 955 $kg/m^3$.

In addition to the base resin and the antioxidants, usual additives for utilization with polyolefins, such as pigments (for example carbon black), stabilizers, antiacids and/or anti-UVs, antistatic agents and utilization agents (such as processing aid agents) may be present in the polyolefin composition.

The amount of such additives usually is 10 wt % or below.

Carbon black is a generally used pigment, which also acts as an UV-screener. Typically carbon black is used in a final amount of from 0.5 to 5% by weight, preferably from 1.5 to 3.0% by weight. Preferably the carbon black is added as a masterbatch, i.e. Carbon black master batch (CBMB) where it is premixed with a polymer, preferably high density polyethylene (HDPE), in a specific amount as e.g. shown in the Examples. Suitable carbon black masterbatches are, among others, HD4394, sold by Cabot Corporation, and PPM1805 by Poly Plast Muller.

The polymerisation catalysts for the production of the base resin include coordination catalysts of a transition metal, such as Ziegler-Natta (ZN), metallocenes, non-metallocenes, Cr-catalysts etc. The catalyst may be supported, e.g. with conventional supports including silica, Al-containing supports and magnesium dichloride based supports. Preferably the catalyst is a ZN catalyst, more preferably the catalyst is a non-silica supported ZN catalyst, and most preferably a $MgCl_2$-based ZN catalyst.

The Ziegler-Natta catalyst further preferably comprises a group 4 (group numbering according to new IUPAC system) metal compound, preferably titanium, magnesium dichloride and aluminium.

The catalyst may be commercially available or be produced in accordance or analogously to the literature. For the preparation of the preferable catalyst usable in the invention, reference is made to WO 2004/055068 and WO 2004/055069 of Borealis and EP 0 810 235. The content of these documents in its entirety is incorporated herein by reference, in particular concerning the general and all preferred embodiments of the catalysts described therein as well as the methods for the production of the catalysts. Particularly preferred Ziegler-Natta catalysts are described in EP 0 810 235.

The composition preferably is produced in a process comprising a compounding step, wherein the base resin which is typically obtained as a base resin powder from the reactor, together with the antioxidants and optionally other additives is extruded in an extruder to yield the composition according to the present invention.

Of course, when using the inventive composition, further compounds selected from conventional additives, fillers, minerals and lubricants may be added for improving processability and surface characteristics thereof.

The composition of the present invention is preferably used in pipes or fittings—black as well as natural (i.e. non-colored) or colored pipes/fittings. Preferably, such a pipe or fitting is used in a drinking water supply system. It is furthermore preferred that the pipe is a cold water pipe, i.e. that it is designed for the transport of cold water.

Hence, the present invention is also directed to a pipe or fitting comprising the inventive polyolefin composition mentioned above including all the preferred embodiments. Such pipes/fittings show an improved resistance against chlorine dioxide-containing water.

The pipes or fittings are preferably produced by extrusion of the polyolefin composition.

The present invention is therefore also directed to the use of a polyolefin composition according to the invention, including all of the preferred embodiments, for the production of a pipe or fitting.

The present invention is also directed to the use of said inventive pipes or fittings for the transport of chlorine dioxide-containing water.

As mentioned above, the present invention is directed to the use of a combination of antioxidants (B) and (C) as defined above, including all of the preferred embodiments, in a polyolefin composition for increasing the lifetime of a pipe or fitting made of said polyolefin composition which pipe/fitting is in permanent contact with chlorine dioxide-containing water.

Preferably, said increased lifetime of the pipe or fitting is shown in a hoop stress test according to ASTM F 2263-03 compared to a pipe made of a corresponding polyolefin composition without any antioxidant, preferably compared to a pipe made of a corresponding polyolefin composition comprising antioxidants or a combination of antioxidants other than the combination of antioxidants (B) and (C) in an equal concentration.

A "corresponding polyolefin composition" denotes a polyolefin composition which comprises the same base resin and the same additives in the same concentration as the inventive polyolefin composition besides the combination of antioxidants (B) and (C).

The "equal concentration" of antioxidants addresses the sum of concentration of antioxidants (B) and (C) and the sum of concentration of antioxidants in corresponding polyolefin compositions.

Preferably, said increased lifetime of the pipe or fitting is shown by a failure time of at least 2500 hours in a hoop stress test according to ASTM F 2263-03.

EXAMPLES

1. Definitions and Measurement Methods a) Density

Density is measured according to ISO 1183-1:2004 on compression moulded specimen prepared according to EN ISO 1872-2 (February 2007) and is given in kg/m'.

b) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylene and determined at a loading of 5.00 kg ($MFR_5$).

c) Measurement of Lifetime of Pipes in Contact with $ClO_2$

No standard exists yet for evaluating the resistance of pipes comprising a polyethylene composition to $ClO_2$-containing water. However, there is a standard for measuring the resistance to chlorinated water: ASTM F2263-03, "Standard test method for evaluating the oxidative resistance of Polyethylene (PE) pipe to chlorinated water". The lifetime of the pipes is tested accordingly with equipment according to ASTM F2263-03. However, $ClO_2$ is applied instead of chlorine.

A circulation loop is used for water which contains $ClO_2$. The concentration of $ClO_2$ in the water is 1.0±0.1 ppm. The pH of the water is 6.8±0.2. The temperature of the water is 90±1° C. The hoop stress applied to the pipe is about 1.7 MPa. The oxidation reduction potential (ORP) is 740 mV and is measured frequently. The flow volume is 23 l/h at a flow velocity of about 0.13 ms and a fluid pressure of 6.5 bar. The free pipe length is 250 mm, the outer diameter of the pipe is 12 mm and the thickness of the wall is 2 mm. The condition time is 1 hour. In the tests two pipes of each material are tested in series. Each pipe is tested until failure. The average of the two lifetime values is calculated.

The circulation loop used for $ClO_2$ testing is made from inert materials (e.g. titanium, PVDF (Polyvinylidene difluoride), PTFE (Polytetrafluoro-ethylene) to avoid contamination of the test fluid. The fittings are of PVDF. The test fluid is continuously purified in three steps to avoid any contamination: 1. active carbon filter, 2. particle filter, 3. reverse osmosis. The internal environment is the above-mentioned solution of $ClO_2$ in water, the external environment is air.

The $ClO_2$ is generated directly at the site using a commercial $ClO_2$-generator from Prominent following the equation:

$$5NaClO_2 + 4HCl \rightarrow 4ClO_2 + 2H_2O + 5NaCl$$

The mechanism for feeding the stock solutions ($NaClO_2$ and HCl) to the process is monitored to maintain a consistent ratio of chemicals.

All tests were carried out at Bodycote Polymer AB, Nyköping, Sweden.

d) Content of Antioxidant

Sample preparation: The polymer pellets are ground in an ultracentrifugal mill (Retsch ZM 100) with a sieve with 2 mm holes. The pellets are cooled down with liquid nitrogen. 5 g of the ground polymer is extracted in 50 ml of cyclohexane at a temperature of 81° C. for 2 hours. If needed, cyclohexane is then added to exact 50 ml again. The solution is cooled down in room temperature and thereafter the polymer is precipitated with 50 ml iso-propanol. A suitable amount of the solution is filtered and injected into HPLC equipment.

The HPLC measurement can e.g. be performed with a reversed phase C-18 column and methanol and water as mobile phase, for example in a ratio of 85:15. A UV detector can be used, wavelength 230 nm for Irganox 1010, Irganox 1330 and Irgafos 168. The quantification is made using calibration curves in a conventional manner.

The following parameters further define the method used:
Instrument: Agilent 1200
Column: Zorbax C18-SB (150×4.6 mm)
Column temperature: 40° C.
Flow: 1 ml/min
Injection volume: 10 µl
Eluent: methanol/water
Gradient: 0 min 85% methanol/15% water, 6 min 100% methanol, 23 min 100% methanol
Detection: UV wavelength 230 nm
Retention times:

| | |
|---|---|
| Irganox 1010 | 10.0 min |
| Irganox 1330 | 10.7 min |
| Irgafos 168 | 18.8 min |
| Phosphate | 12.6 min |

Phosphate is obtained by hydrolysis from Irgafos168.

2. Lifetime of Pipes Comprising Different Antioxidants

The compositions for the examples were compounded/melt homogenized in a Buss-Co-Kneader 100 MDK/E-11 L/D. Polymer and additives were fed into the first mixer inlet of the Buss Co-Kneader which is a single screw extruder with a downstream discharge single extruder with pelletizing unit cutting pellets in molten stage and cooled via water. The mixer temperature profile was 91/164/193/189/196° C. from first inlet to outlet, and discharge extruder temperature 113° C. The mixer screw rpm was 195 rpm and the throughput 175 kg/h.

Pipes 12 mm×2 mm (outer diameter×wall thickness) were prepared by extrusion in a Battenfeld 45-25B extruder, which gave an output of 15 kg/h at a screw speed of 20 rpm. The extruder melt temperature was 218° C.

Polyolefin (A) used as base resin in all examples is an unstabilised bimodal medium density polyethylene with a total 1-butene comonomer content of 3.1 wt % whereby the comonomer is present exclusively in the high molecular weight part of the polyethylene, an $MFR_5$ of 0.81 g/10 min, and a density of 941 kg/m³.

The additives which were added to the base resins to yield the polyethylene compositions used for pipe production are given in Table 1. If not indicated otherwise, the values are given in wt %. Still further, in Table 1 also the results of the lifetime tests in $ClO_2$-containing water are given.

A carbon black master batch was used containing 60.4 wt % high density polyethylene, 39.5 wt % carbon black and 0.1 wt % Irganox 1010.

In the Examples according to the invention (Examples 1 and 2) a mixture of two antioxidants is used, namely 1,3,5-Trimethyl-2,4,6-tris-(3,5-di-tert. butyl-4-hydroxy-phenyl)

benzene (CAS No. 1709-70-2, Irganox 1330 from Ciba Speciality Chemicals) and Tris(2,4-di-tert. butylphenyl)phosphite (CAS No. 31570-04-4, Irgafos 168 from Ciba Speciality Chemicals).

In Comparative Examples 1 and 2 a typical conventional mixture of antioxidants is used, namely Tris(2,4-di-tert. butylphenyl)phosphite (CAS No. 31570-04-4, Irgafos 168 from Ciba Speciality Chemicals) and Pentaerythrityl-tetrakis (3-(3',5'-di-tert. butyl-4-hydroxyphenyl)propionate) (CAS No. 6683-19-8, Irganox 1010, from Ciba Speciality Chemicals).

Hence, in the inventive Examples Irganox 1010 used in the Comparative Examples is substituted by Irganox 1330. It can be seen that the inventive combination of antioxidants achieves a highly improved resistance against ClO$_2$-containing water.

TABLE 1

|  | Example 1 | Example 2 | Comp. Example 1 | Comp. Example 2 |
| --- | --- | --- | --- | --- |
| base resin | 93.88 | 93.55 | 93.88 | 93.55 |
| calcium stearate | 0.15 | 0.15 | 0.15 | 0.15 |
| carbon black MB | 5.75 | 5.75 | 5.75 | 5.75 |
| Irganox 1330/ppm | 1100 | 4400 | — | — |
| Irganox 1010/ppm | — | — | 1100 | 4400 |
| Irgafos 168/ppm | 1100 | 1100 | 1100 | 1100 |
| antioxidants, total/ppm | 2200 | 5500 | 2200 | 5500 |
| ClO$_2$-resistance 1/h$^a$ | 2839 | 3827 | 1398 | 2135 |
| ClO$_2$-resistance 2/h$^a$ | 2594 | 4143 | 1670 | 2833 |
| average value/h | 2717 | 3985 | 1534 | 2484 |

$^a$until failure

The invention claimed is:

1. A method for increasing the lifetime of a pipe or a fitting made of a polyolefin composition, produced in a sequential multistage process utilizing reactors coupled in series, using a combination consisting of two antioxidants (B) and (C), at least one transition metal, at least one pigment, at least one filler, at least one mineral, and at least on lubricant in said polyolefin composition, wherein said antioxidants are the following:
antioxidant (B) with general formula R$^1$—P(OAr)$_2$, wherein OAr is according to formula (I):

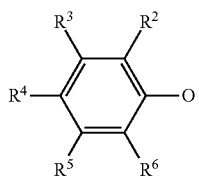

wherein
R$^1$ is a non-substituted or substituted aliphatic or aromatic hydrocarbyl radicals which may comprise heteroatoms, R$^2$, R$^3$, R$^4$, R$^5$ and R$^6$ independently are a hydrogen atom or non-substituted or substituted aliphatic or aromatic hydrocarbyl radicals which may comprise heteroatoms, and antioxidant (C) according to formula (II):

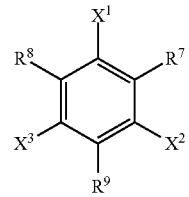

wherein
R$^7$, R$^8$ and R$^9$ independently are non-substituted or substituted aliphatic or aromatic hydrocarbyl radicals which may comprise OH-groups, X$^1$, X$^2$, and X$^3$ independently are H or OH, with the proviso that at least one of X$^1$, X$^2$ and X$^3$ is OH, and the entire molecule does not comprise an ester group;

wherein the pipe or fitting is in permanent contact with chlorine dioxide-containing water.

2. The method according to claim 1, wherein the polyolefin composition further comprises a base resin (A), which comprises an ethylene homo- or copolymer.

3. The method according to claim 2, wherein the base resin (A) of the polyolefin composition consists of an ethylene homo- or copolymer.

4. The method according to claim 1, wherein R$^1$ is OAr.

5. The method according to claim 1, wherein R$^3$ and R$^5$ are hydrogen atoms and at least one of R$^2$, R$^4$ and R$^6$ is an alkyl radical.

6. The method according to claim 1, wherein R$^7$ and R$^8$ are alkyl radicals with 3 to 10 carbon atoms.

7. The method according to claim 1, wherein R$^9$ has from 30 to 70 carbon atoms and includes one or more phenyl residues.

8. The method according to claim 1, wherein the sum of concentration of antioxidants (B) and (C) is between 1500 and 6000 ppm.

9. The method according to claim 1, wherein said increased lifetime of the pipe or fitting is shown in a hoop stress test according to ASTM F 2263-03 compared to a pipe or fitting made of a corresponding polyolefin composition comprising antioxidants or a combination of antioxidants other than the combination of antioxidants (B) and (C) in an equal concentration.

10. The method according to claim 9, wherein said increased lifetime of the pipe or fitting is shown by a failure time of at least 2500 hours in a hoop stress test according to ASTM F 2263-03.

* * * * *